Oct. 25, 1960     J. H. HOLLYDAY     2,957,500
TYING MECHANISM
Filed April 16, 1957
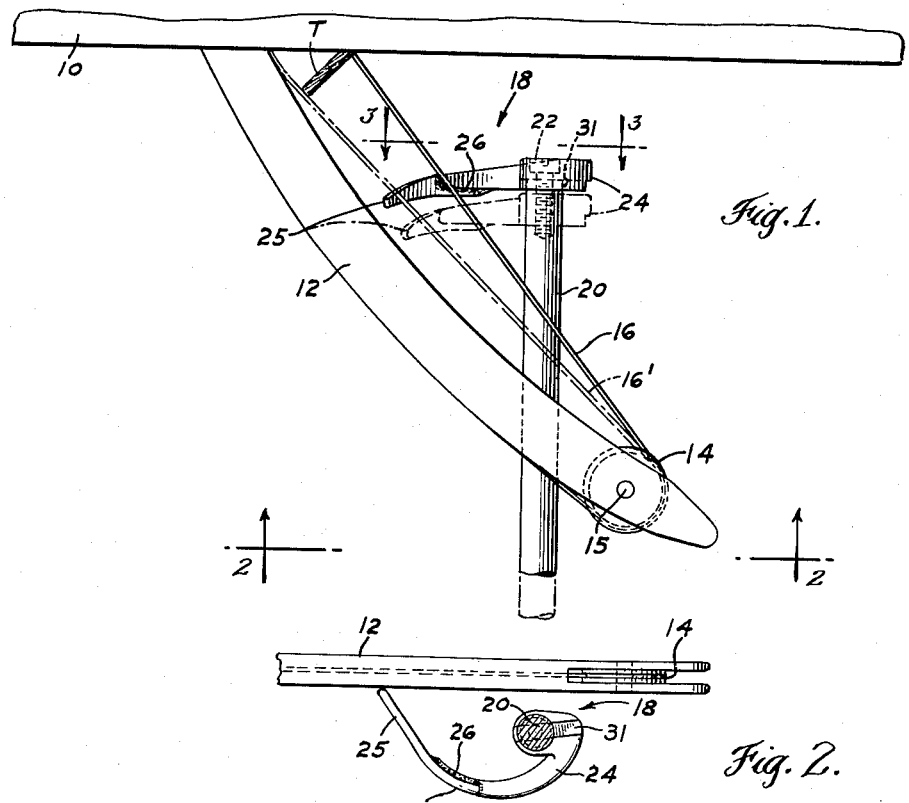
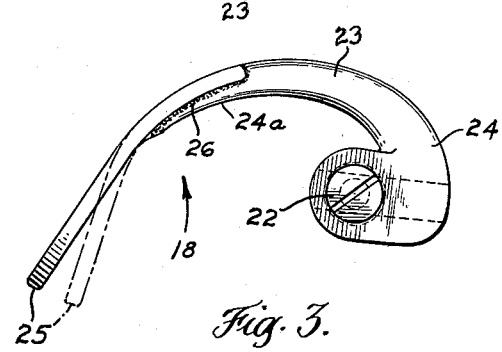
INVENTOR
JAMES H. HOLLYDAY
Joseph Allen Brown
ATTORNEY

United States Patent Office 2,957,500
Patented Oct. 25, 1960

2,957,500

TYING MECHANISM

James H. Hollyday, New Holland, Pa., assignor to Sperry Rand Corporation, New Holland, Pa., a corporation of Delaware Filed Apr. 16, 1957, Ser. No. 653,086

3 Claims. (Cl. 140—149)

The present invention relates to hay balers of the type having an automatic wire tying mechanism operative to tie together the ends of a wire loop. More particularly, the invention relates to an improvement in a twister hook of the type shown in Burford, U.S. Patent No. 2,551,873, issued May 8, 1951.

The twister hook in the above identified patent comprises a rotatable shaft having a hook at one end. The hook is made of rigid material; and, it is adapted to engage a pair of wires and twist them together.

When light or average material is baled in a baler having a Burford type twister hook, the so-called No. 2 wires, that is, the wires delivered by the needle mechanism, extend in a given position when the needles of the mechanism are at the outermost point of a delivery stroke. However, when heavy material is baled, the No. 2 wires are sometimes deflected from such position by material projecting through slots, interstices, or other openings in the bale chamber. It is desirable, therefore, that the twister hook be disposed in proper position for engaging the wires, whether the No. 2 wires are in proper or deflected position.

The twister hooks must be properly positioned relative to the bale case of the baler and also relative to the needles which deliver the No. 2 wires. Due to variances in manufacturing tolerances from one baler to another, a twister hook may be properly disposed in one position on one baler and require a slightly different position in another baler. It is important, therefore, that the twister hook be adjustable.

Heretofore, twister hooks have been provided which are adjustable by longitudinally adjusting the shafts on which they are mounted to achieve desired twisting characteristics. Such adjustment moves the hooks toward or away from the bale case and alters their position relative to the needles. Difficulty is created in that when the twister hooks are properly disposed relative to the bale case, they may not be in the best position relative to the needles, and vice versa. Thus, it has been practiced to adjust the twister hooks to a compromise position relative to the bale case and the needles of the needle mechanism.

The primary object of this invention is to provide a twister hook which, in addition to being adjustable by adjustment of the shaft on which it is mounted, has a portion which is adjustable relative to the shaft thereby enabling a fine adjustment of the hook to optimum operating position whereby the hook is able to pick up No. 2 wires whether such wires are in proper position or deflected by the material being baled.

Another object of this invention is to provide a twister hook having an adjustable wire engaging portion and a fixed wire twisting portion.

A further object of this invention is to provide a twister hook which can be manufactured at low cost with no material increase in the cost over hooks heretofore used.

Other objects of this invention will be apparent hereinafter from the specification and from recital in the appended claims.

In the drawing:

Fig. 1 is a fragmentary plan view of a portion of a bale case of an automatic hay baler and showing a twister hook constructed according to one embodiment of this invention, the hook being shown in one position of adjustment in solid lines and in an optimum position of adjustment in dotted lines;

Fig. 2 is a section taken on the line 2—2 of Fig. 1 and looking in the direction of the arrows; and Fig. 3 is a view taken on the line 3—3 of Fig. 1 and looking in the direction of the arrows.

Referring now to the drawing by numerals of reference, 10 denotes a bale case in which bales are formed. The bale case has suitable slots, not shown, whereby needles of a conventional needle mechanism may be projected from one side of the bale case to the opposite side thereof to deliver a loop of wire to complete the banding of a bale. One of the needles of this mechanism is shown, namely, needle 12. Such needle is illustrated at the outer most point of a wire delivery stroke. The needle has a roller 14 carried at its free end on a pin 15 and around which the loop of wire 16 being delivered extends.

Normally, the inboard or No. 2 strand of the loop of wire 16 delivered by needle 12 extends as shown in solid lines in Fig. 1 and denoted 16 when the needle is at the end of a working stroke. However, occasionally, trash or other material T extends through the side of the bale case and engages the No. 2 wire pushing it away from its normal position to the dotted line position 16'. When extending as shown in dotted lines, it is difficult for the twister device 18 to catch onto and pick up the No. 2 strand when the hook is rotated. In some cases, the wire may be missed completely causing disruption of the baling operation. The twister device of this invention enables the elimination of this problem by providing means for adjusting the hook of the device to the dotted line position illustrated where it can readily catch onto the No. 2 wire whether such wire is in proper position or deflected position.

The twister comprises a shaft or spindle 20 mounted for rotation by any suitable means, such as that shown in U.S. Patent 2,551,873. Affixed to shaft 20 by means of a screw 22 is an arcuate hook 23. Hook 23 comprises two sections, namely, section 24 and section 25. Section 24 is constructed of "Stellite" or some other suitable hard, relatively inflexible material, whereas section 25 is made of a relatively bendable metal. The bendable section is connected to the rigid section as by welding, denoted 26.

As shown best in Fig. 3, section 24 of the hook has a thin lip 24a which overlies a portion of section 25, the lip tapering from its inner to its outer end and providing an extended hard surface on which the wires to be twisted may slide and minimizing the engagement of the wires with section 25.

In Fig. 1, the twister hook is shown extending generally perpendicular to the side of the bale case 10. However, it may be angularly disposed relative to the case. As shown in dotted lines, the hook is adjustable toward or away from the bale case. The means for accomplishing such adjustment is not shown, any suitable means being employable. The "Stellite" portion 24 of the hook extends transversely relative to the rotational axis of shaft 20. The section 25, in addition to its transverse extension, is preferably bent away from the bale case (Fig. 1) so that an angle is formed between the axis of the spindle and member 25 which is less than 90 degrees. As previously stated, the hook 23 as a whole is generally arcuate when viewed in plan. By applying pliers or the like to the tip of section 25, such tip may be bent and thereby adjusted toward or away from shaft 20, Fig. 3. Further, section 25 may be adjusted to vary the angle between the axis of shaft 18 and the section.

The advantage of applicant's structure will be readily apparent from Fig. 1. When the No. 2 wires are more or less continually pushed from normal position 16 to position 16' by trash T, section 25 of the hook may have to be bent so that it is better able to engage the No. 2 wires. Further, the deflections of the No. 2 wires may affect the twisting characteristics of the mechanism and it may be found desirable to axially adjust shaft 20 to maintain the desired twisting action. However, it will be seen that if shaft 20 is moved away from bale case 10, the clearance between the tip of hook 18 and needle 12 is altered and interference may result. However, such is no problem with applicant's hook, since the tip 25 may be bent as desired to maintain the necessary clearance.

Even though applicant's hook is capable of being adjusted, it possesses all of the advantages of the rigid hooks heretofore used. Wire 16, when it is picked up, slides onto the section 24 of the hook. The tapered lip 24a of section 24 provides a long arcuate surface so that as the wire 16 is drawn tight on rotation of the hook and as it slides towards the rotational axis of spindle 18, its movement is primarily on a hard surface. This provides long-wearing qualities; and the smooth arcuate surface upon which the wires are able to slide protects against damage to the wires.

While this invention has been described in connection with a particular embodiment thereof, it will be understood that it is capable of further modification, and this application is intended to cover any variations, uses, or adaptations, of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. In an automatic wire-tie hay baler, a device for twisting together the ends of a loop comprising a rotatable shaft, a single hook affixed to said shaft and rotatable therewith, said hook being disposed generally in a plane transverse to the rotational axis of said shaft and having two sections of dissimilar material, one fixedly connected to said shaft and the other joined to said one section, said one section being made of a rigid material and the other section of a different relatively easily bendable material whereby the other section may be bent relative to the one section and said shaft to thereby vary the radial extension of the hook with respect to the axis of said rotatable shaft.

2. A device as recited in claim 1 wherein said hook is of arcuate configuration and has an inner face and an outer face, said one section having a lip which partially overlies the inner face of said other section.

3. A device as recited in claim 2 wherein said inner faces of said one section and said other section blend together to thereby provide a substantially unbroken arc on said inner face.

References Cited in the file of this patent

UNITED STATES PATENTS

| | | |
|---|---|---|
| 1,015,503 | Merrill | Jan. 23, 1912 |
| 1,596,818 | Dowd | Aug. 17, 1929 |
| 2,443,564 | Kunkle et al. | June 15, 1948 |
| 2,472,510 | Bennett | June 7, 1949 |

FOREIGN PATENTS

| | | |
|---|---|---|
| 142,322 | Great Britain | May 6, 1920 |